(12) United States Patent
Richardson et al.

(10) Patent No.: US 8,714,299 B2
(45) Date of Patent: May 6, 2014

(54) ACOUSTIC ISOLATION MECHANISM

(71) Applicant: Otter Products, LLC, Fort Collins, CO (US)

(72) Inventors: Curtis Richardson, Fort Collins, CO (US); John Loudenslager, Phoenix, AZ (US); Jamie Johnson, Fort Collins, CO (US); Jason Thompson, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 13/911,317

(22) Filed: Jun. 6, 2013

(65) Prior Publication Data

US 2013/0264143 A1 Oct. 10, 2013

Related U.S. Application Data

(63) Continuation of application No. 12/950,821, filed on Nov. 19, 2010, now Pat. No. 8,479,875.

(60) Provisional application No. 61/262,848, filed on Nov. 19, 2009.

(51) Int. Cl.
*H04M 1/00* (2006.01)

(52) U.S. Cl.
USPC ............ 181/205; 379/451; 361/679.56

(58) Field of Classification Search
USPC ............ 181/198, 200, 205; 379/451, 454; 361/679.02, 679.09, 679.55, 679.56; 455/575.1
See application file for complete search history.

(56) References Cited

U.S. PATENT DOCUMENTS

| | | | | |
|---|---|---|---|---|
| 4,326,102 A | * | 4/1982 | Culp et al. | 379/443 |
| D574,819 S | * | 8/2008 | Andre et al. | D3/269 |
| D575,056 S | * | 8/2008 | Tan | D3/218 |
| D582,149 S | * | 12/2008 | Tan | D3/218 |
| D597,089 S | * | 7/2009 | Khan et al. | D14/250 |
| D603,603 S | * | 11/2009 | Laine et al. | D3/218 |
| D606,751 S | * | 12/2009 | Andre et al. | D3/269 |
| 7,933,122 B2 | * | 4/2011 | Richardson et al. | 361/679.55 |
| 2002/0009195 A1 | * | 1/2002 | Schon | 379/454 |
| 2002/0065054 A1 | * | 5/2002 | Humphreys et al. | 455/90 |
| 2009/0247244 A1 | * | 10/2009 | Mittleman et al. | 455/575.1 |

FOREIGN PATENT DOCUMENTS

JP 2001061530 A * 3/2001 ............. A45C 11/00

OTHER PUBLICATIONS

English translation for JP 2001061530 A, accessed Dec. 18, 2012 from JPO website.*

* cited by examiner

*Primary Examiner* — Jeremy Luks

(57) ABSTRACT

A rigid removable case for a portable electronic device may have an acoustic isolation mechanism between the rigid removable case and an acoustic component on the electronic device. The acoustic isolation mechanism may be a compressible component that may provide an air seal between an interior surface of the removable case and an exterior surface of the electronic device. The acoustic isolation mechanism may be constructed of several different materials and several different manufacturing processes.

7 Claims, 6 Drawing Sheets

ACOUSTIC ISOLATION MECHANISM

CROSS-REFERENCE TO RELATED APPLICATIONS

This patent application is a continuation of U.S. patent application Ser. No. 12/950,821, filed Nov. 19, 2010 (issued as U.S. Pat. No. 8,479,875, on Jul. 9, 2013), and claims the benefit of U.S. Provisional Patent Application No. 61/262,848, filed Nov. 19, 2009, both of which are hereby incorporated by reference in their entirety.

BACKGROUND

Many handheld devices may have acoustic components, such as speakers and microphones. Examples of such devices may be handheld cellular telephones, tablet computers, laptop computers, and other such devices.

SUMMARY

A rigid removable case for a portable electronic device may have an acoustic isolation mechanism between the rigid removable case and an acoustic component on the electronic device. The acoustic isolation mechanism may be a compressible component that may provide an air seal between an interior surface of the removable case and an exterior surface of the electronic device. The acoustic isolation mechanism may be constructed of several different materials and several different manufacturing processes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An acoustic isolation device may be placed between an electronic device and a hard shell cover. The acoustic isolation device may form an air passageway between an opening in the hard shell cover to a corresponding opening in the electronic device through which sound may pass to an audio component, which may be a speaker or microphone.

The acoustic isolation device may be manufactured from various types of compressible materials, such as open cell and closed cell foams, thermoplastic elastomers, and other pliable materials. In some embodiments, the acoustic isolation device may be separately manufactured and attached to a hard shell cover using adhesives or other bonding methods. In other embodiments, the acoustic isolation device may be molded onto the hard shell case using a two-shot molding technique or secondary molding process. In still other embodiments, the acoustic isolation device may be incorporated into a removable component that may wrap the hard shell case.

The acoustic isolation device may provide several functions. In some embodiments, the acoustic isolation device may provide an airtight seal between the hard shell cover and the device. The airtight seal may enhance acoustics by preventing echoes or other acoustic noise between the hard shell cover and the device.

In some embodiments, the acoustic isolation device may take up slack between the device and the hard shell cover, preventing the device from shifting within the cover and potentially reducing rattling or other acoustic noise.

In some embodiments, the acoustic isolation device may dampen vibrations in the hard shell case that may cause acoustic noise by reducing acoustical feedback. The feedback may be reduced by preventing acoustical energy from travelling between a hard shell and a device. Without the acoustic isolation mechanism, acoustic energy from a speaker in the device may cause the hard shell to resonate and degrade audio quality. In the case of a microphone, the acoustic isolation mechanism may reduce ambient acoustic noise that may be gathered by the hard shell and transmitted from the hard shell into a microphone, adding unwanted noise to the acoustic signal.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
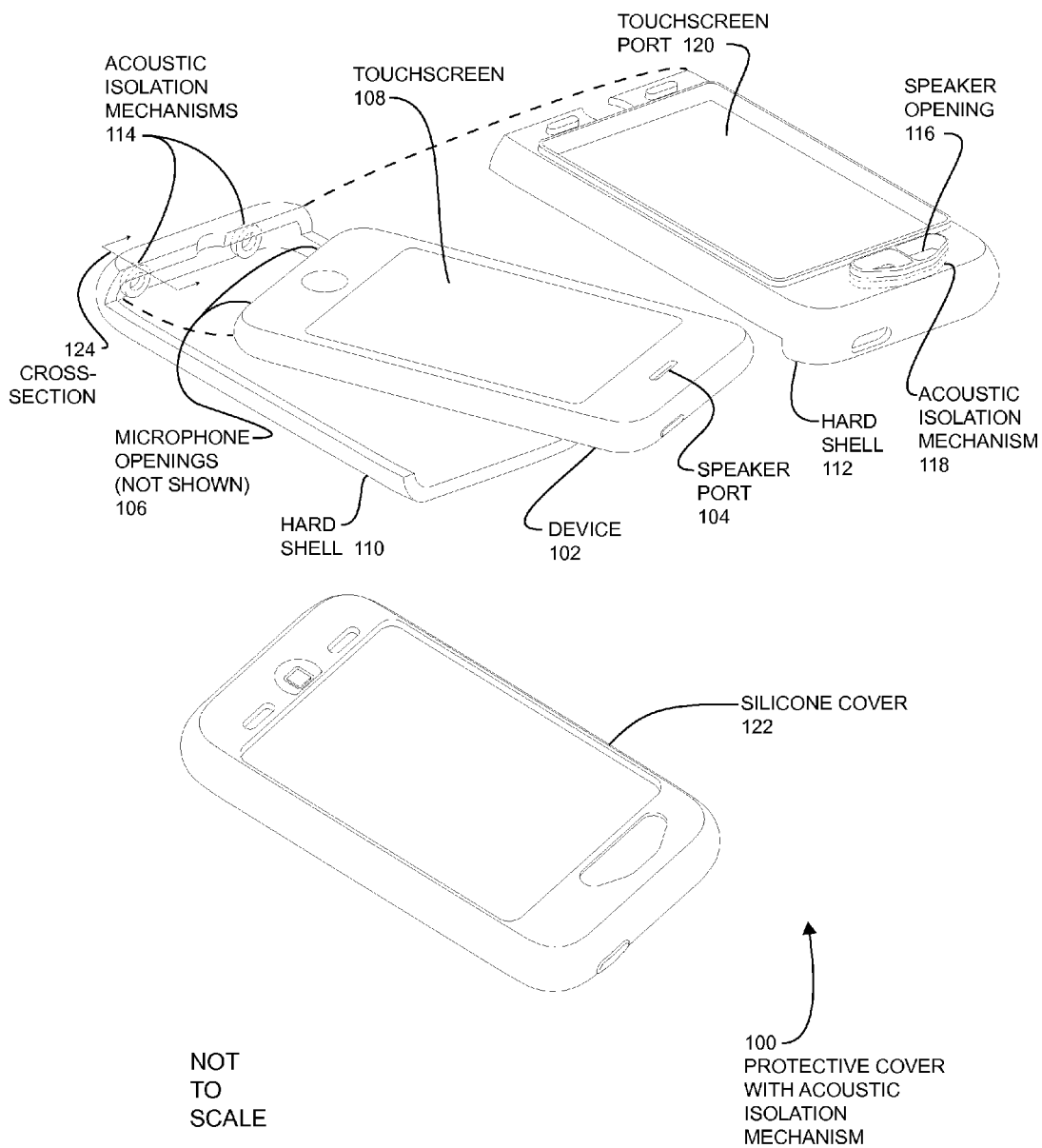
FIG. 1 is a perspective illustration of an embodiment showing a device with a protective cover having an acoustic isolation mechanism.

FIG. 1 is a perspective view of an embodiment 100, showing a device with a protective cover. Embodiment 100 is merely one example of a two-piece hard shell case that may have an acoustic isolation mechanism.

Embodiment 100 is an example of a device 102 with a protective cover. The device 102 may be a cellular telephone, personal digital assistant, camera, portable instrument, barcode scanner, laptop computer, tablet computer, or any other device.

In many embodiments, the protective cover may be a supplemental cover for a commercial product. The supplemental cover may be an aftermarket cover that a user may install after purchasing an electronic device or other item that may be covered. In many embodiments, such aftermarket covers may be installed and removed by a user.

Many embodiments may operate as protective covers that may insulate a device from physical damage, including mechanical abrasion such as scratches, as well as damage from dropping or other physical trauma. Some embodiments may provide protection from water, including some embodiments that may be waterproof to some depth of water.

Some embodiments may operate as aesthetic or decorative enhancements to allow a user to personalize their device. In such embodiments, the various components of a protective case may be designed with aesthetic or decorative elements, or may be manufactured with different colors, designs, or textures.

Some embodiments may provide various additional components that may not be available with a stock device. For example, a protective case may have a belt loop holder which may be integrated into the protective case or may have features that engage a carrier or holder of some sort.

Throughout this specification, the term "protective case" is used to describe a case or cover that comprises a rigid component and a flexible component. The adjective "protective" is merely used as a descriptor for the case and is not meant to be limiting in any manner. For example, some embodiments may provide very little, if any, protection from physical trauma.

In embodiments where a user may install the protective case, the components of the protective case may be designed to be removable. Such embodiments may provide mechanisms for the protective case components to snap together or otherwise engage each other, as well as a removable flexible component.

In embodiments where a case may be installed in a permanent or semi-permanent fashion, the case components may be assembled using adhesives, ultrasonic welding, snap fits, or other mechanisms. In some embodiments that are installed in a permanent manner, a flexible component may be formed by injection molding the flexible component directly to the rigid component. Some such embodiments may be manufactured using a two-shot molding process.

A cover for the device 102 may have a rigid component and a flexible component. The rigid component may be a rigid component that may be designed in two or more pieces in some designs. The rigid component may be manufactured from various injection molded thermoplastics, thermoset plastics, composites, metals, or other materials. The flexible component may be manufactured from a flexible, stretchable material and may be designed to wrap around the rigid component on several sides. Some embodiments may use a molded silicone, for example, which may stretch to allow installation and may wrap around several sides of a device to stay in place.

In the example of embodiment 100, two hard shells 110 and 112 may snap or fit together to produce a rigid cover that encapsulates the device 102. Hard shell 110 may fit against the rear contour of the device 102, and the hard shell 112 may fit against the front contour of the device 102.

The hard shells 110 and 112 may be designed to contact the device 102 in specific areas or surfaces to minimize rattling or shifting between the device 102 and the assembled hard shell case. In some embodiments, the hard shells 110 and 112 may be designed to follow the contour of the device 102 with some assembly and manufacturing tolerance for a slight slip fit or, in some instances, a slight interference fit. Some embodiments may be designed with an interference fit which may slightly stress the assembled hard shell. Such embodiments may be useful to minimize shifting between the hard shell and the device.

In embodiments where a slip fit or intentional gap is designed between the hard shell and the device, one or more acoustic isolation mechanisms may be used to take up any gaps. Such embodiments may allow for larger manufacturing tolerances in the hard shell cover while still providing adequate protection and minimizing shifting or rattling of the device.

The device 102 is illustrated with a touchscreen 108, which may represent a cellular telephone, personal digital assistant, or other device. The touchscreen 108 may be activated and used through the touchscreen port 120, which may or may not have a transparent film. In some embodiments, the touchscreen port 120 may be an opening so that a user may directly contact the touchscreen 108.

The case may have a hard shell over which a silicone cover 122 may be assembled. The silicone cover 122 may be stretched to surround the hard shell. In some embodiments, portions of the hard shell may be exposed through the silicone cover 122.

In some embodiments, the silicone cover 122 may include features that serve as an acoustic isolation device. An example of such an embodiment may be illustrated in embodiment 600 presented later in this specification.

The device 102 may be representative of a cellular phone, and may have a speaker port 104 and one or more microphone openings 106. The device 102 may have a speaker component and microphone components inside the device's exterior case, which may have ports or openings through which sound may travel. In some embodiments, the device 102 may use acoustic pipes or other mechanisms for transferring acoustic energy between the exterior of the device 102 and the acoustic component within the device.

The hard shell 110 is illustrated as having two acoustic isolation mechanisms 114 located in the bottom area of the hard shell 110. The acoustic isolation mechanisms 114 may correspond to and mate with the microphone openings 106 on the device 102.

The acoustic isolation mechanisms 114 may be constructed using several different manufacturing techniques and several different materials. Examples of different designs may be found later in this specification.

Similar to the microphones, the speaker port 104 of the device 102 may have an acoustic isolation device 118 to which the speaker port 104 may mate. The acoustic isolation device 118 may form a seal between the exterior surface of the device 102 and the interior surface of the hard shell 112 to form a channel for acoustic energy to travel. The acoustic energy may exit the hard shell 112 through the speaker opening 116.

Figure 2:
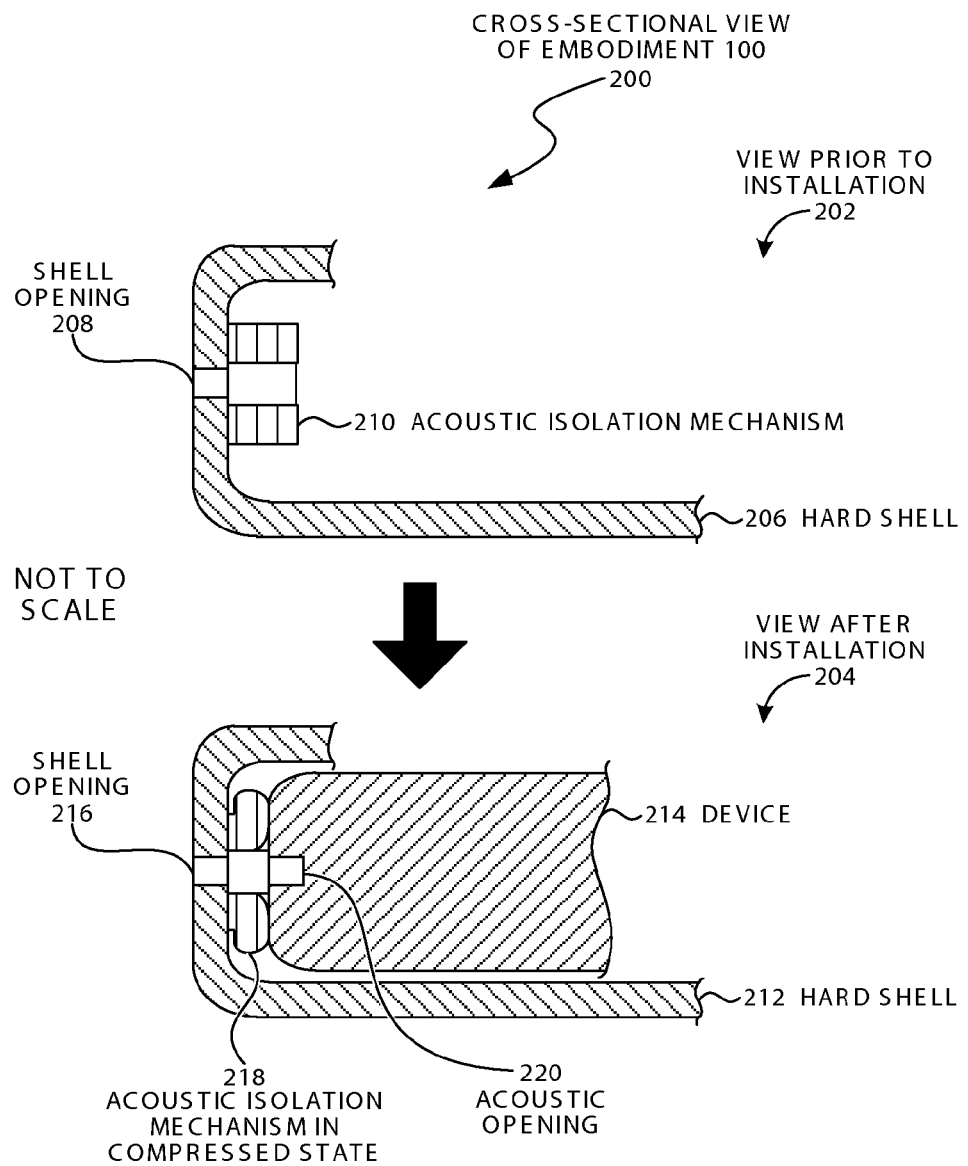
FIG. 2 is a cross-sectional illustration of an embodiment showing an acoustic isolation mechanism prior to and after installation.

FIG. 2 is a cross-sectional view of an embodiment 200 showing the acoustic isolation mechanisms 114, as per the cross section 124 of embodiment 100. Embodiment 200 is not to scale. The view 202 may represent the hard shell 206, the shell opening 208, and the acoustic isolation mechanism 210 prior to installing the device.

The view 204 may illustrate the hard shell 212 with the device 214 installed. During installation, the acoustic isolation device 218 may be compressed to form a seal to the device 214 in the area around the acoustic opening 220. The acoustic isolation mechanism 218 may form a passageway so that acoustic energy may pass between the shell opening 216 and the device's acoustic opening 220.

In many embodiments, an acoustic isolation mechanism may form a seal against the exterior surface of the device. The seal may be an airtight seal in some embodiments, while in other embodiments, the seal may not be airtight. In the case of an airtight seal, the acoustic isolation mechanism may be an annular ring or other shape that completely surrounds the acoustic opening 220 and the shell opening 216. In the case of a seal that may not be airtight, the acoustic isolation mechanism may only partially surround the acoustic opening 220 and the shell opening 216.

The compression of the acoustic isolation mechanisms may provide some internal force to push the device towards the right in the figure. The internal force may take up any extra space, designed-in gaps, and manufacturing tolerances within the assembled hard shell case. The internal force may minimize shifting or rattling of the device.

Figure 3:
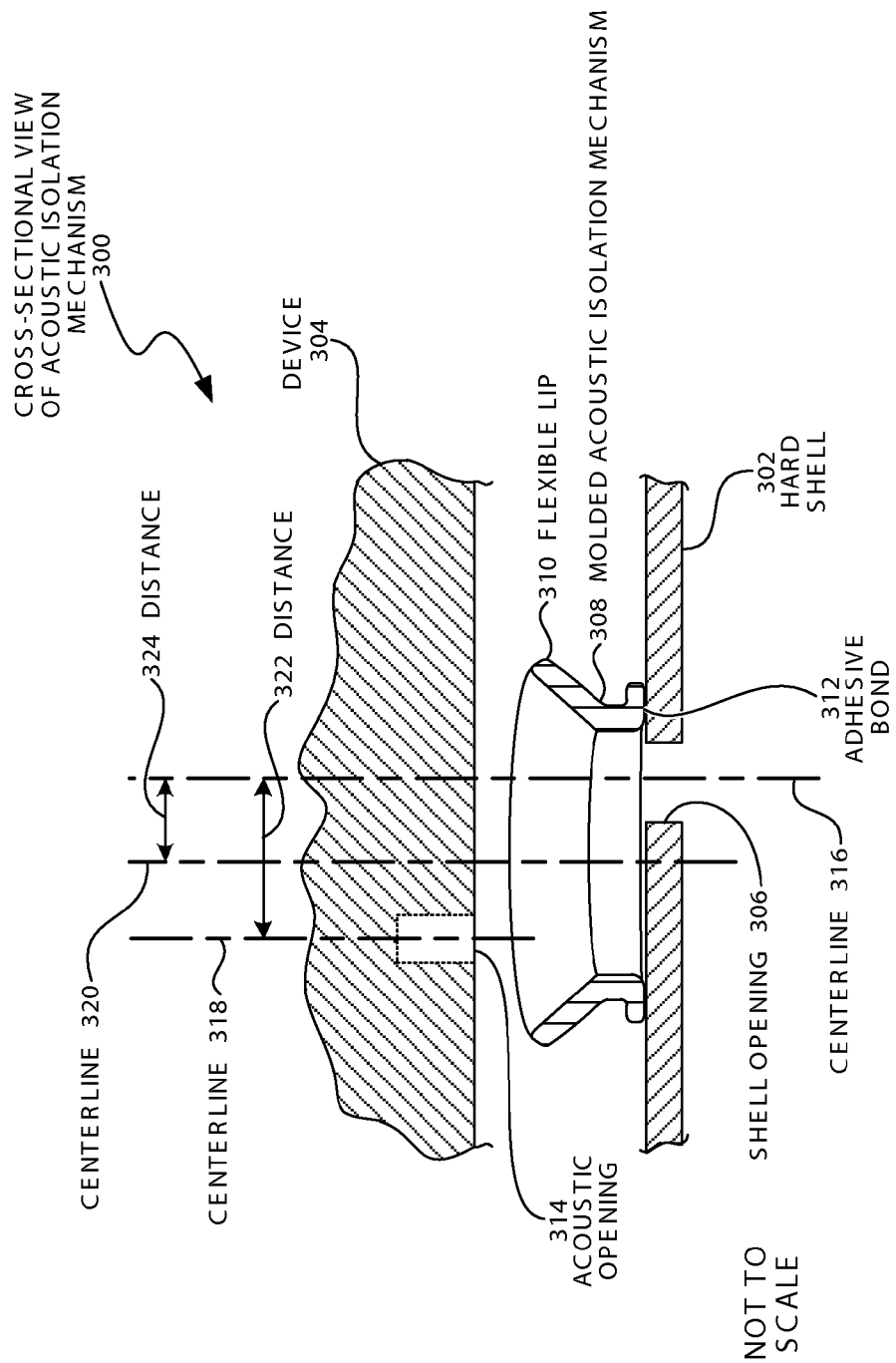
FIG. 3 is a cross-sectional illustration of an embodiment showing a first embodiment of an acoustic isolation mechanism.

FIG. 3 is a cross-sectional view of an embodiment 300 showing another acoustic isolation mechanism. Embodiment 300 is not to scale. Embodiment 300 may illustrate a flexible gasket type acoustic isolation mechanism that may be molded of silicone rubber or other thermoplastic elastomer. Embodiment 300 further illustrates an example where the acoustic opening in a device may be offset from the shell opening, and the acoustic isolation mechanism may seal the gap between the two openings.

A hard shell 302 and a device 304 may be illustrated in close proximity but prior to being fully installed. When fully installed, the device 304 may be in contact with the molded acoustic isolation mechanism 308 such that the flexible lip 310 may deform and create a seal against the device 304.

The acoustic isolation mechanism 308 may have a lower surface that may be attached to the hard shell 302 through an adhesive bond 312. The adhesive bond 312 may be made with a pressure sensitive adhesive, epoxy, cyanoacrylate, or other type of adhesive. In some embodiments, the acoustic isolation mechanism may be attached using ultrasonic welding or some other attachment mechanism.

Embodiment 300 illustrates an embodiment where the shell opening 306 may not be aligned with the acoustic opening 314 or the acoustic isolation mechanism 308. The shell opening 306 is illustrated as having a centerline 316, while the acoustic opening 314 is illustrated as having a centerline 318 and the acoustic isolation mechanism 308 is illustrated as having a centerline 320.

The distance 322 illustrates the offset from the acoustic opening 314 and the shell opening 306, and the distance 324 illustrates the offset from the acoustic isolation mechanism 308 to the shell opening 306.

In some embodiments, the distances 320 or 324 may be 0.010 in, 0.020 in, 0.050 in, or larger. In some embodiments, the distances 320 or 324 may be sized to account for various assembly or manufacturing tolerances.

Figure 4:
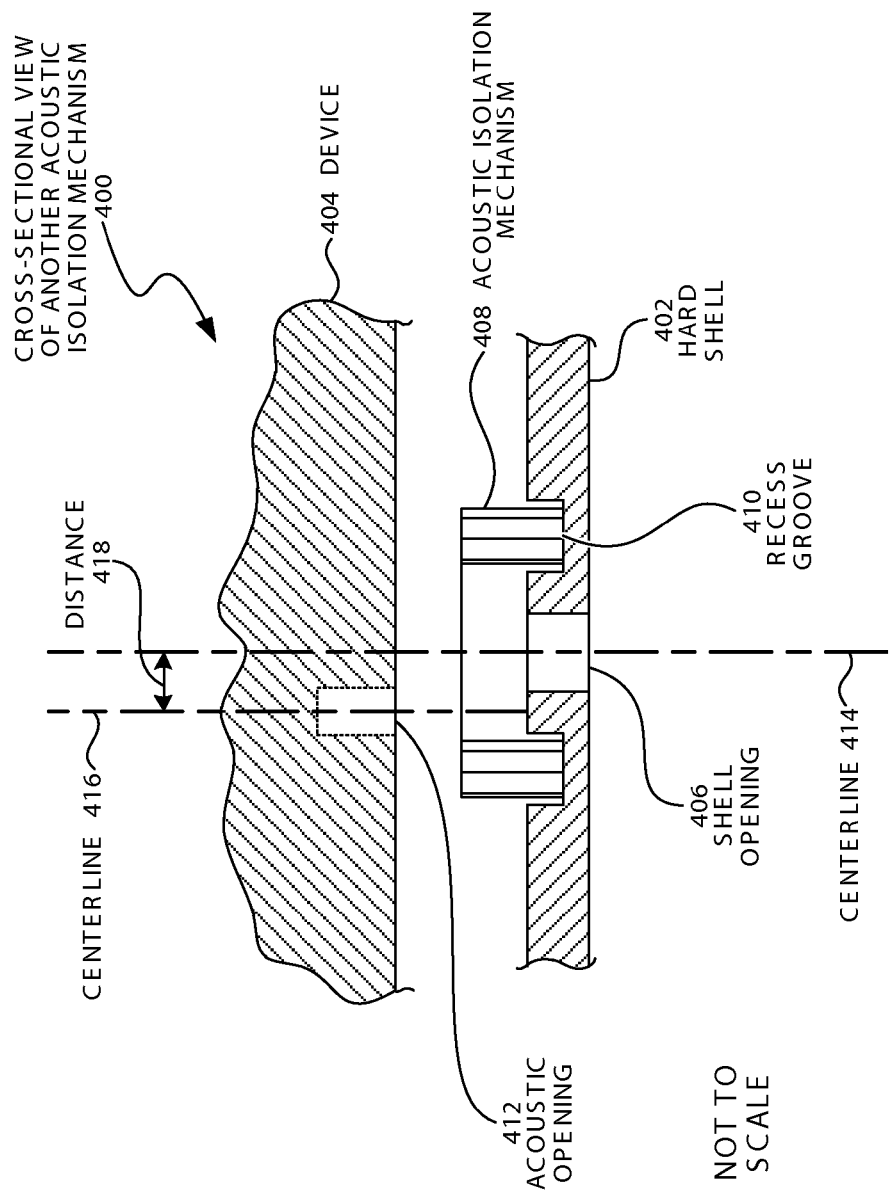
FIG. 4 is a cross-sectional illustration of an embodiment showing a second embodiment of an acoustic isolation mechanism.

FIG. 4 is a cross-sectional view of an embodiment 400 illustrating another example of an acoustic isolation mechanism. Embodiment 400 is not to scale. Embodiment 400 shows a hard shell 402 and a device 404 with an acoustic isolation mechanism 408, where the acoustic isolation mechanism may be formed by punching the shape from a foam or other compliant material. Embodiment 400 illustrates the hard shell 402 and device 404 in close proximity but prior to engaging into a fully assembled position.

The hard shell 402 may have a shell opening 406 that has a recess groove 410 in which the acoustic isolation mechanism 408 may be placed. The recess groove 410 may perform several functions in various embodiments. In some embodiments, the recess groove 410 may be wider than the acoustic isolation mechanism 408 and may allow for the acoustic isolation mechanism 408 to squeeze or deform into the groove 410, which may allow the device 404 to come closer to the hard shell 402 when fully assembled. In some embodiments, the recess groove 410 may serve as a manufacturing aid to guide an operator to the proper placement of the acoustic isolation mechanism 408.

The acoustic isolation mechanism 408 may be manufactured from stamping or die cutting a shape in a foam material. In many such embodiments, the foam layer may have an adhesive layer attached prior to die cutting. The acoustic isolation mechanism 408 may be attached by removing a backing material to expose the adhesive, then placing the acoustic isolation mechanism 408 in the recess groove 410.

The shell opening 406 may have a centerline 414 that may be offset by a distance 416 from a centerline 416 of the acoustic opening 412. In many embodiments, the distance 418 may be 0.010 in, 0.020 in, 0.050 in, or larger.

Figure 5:
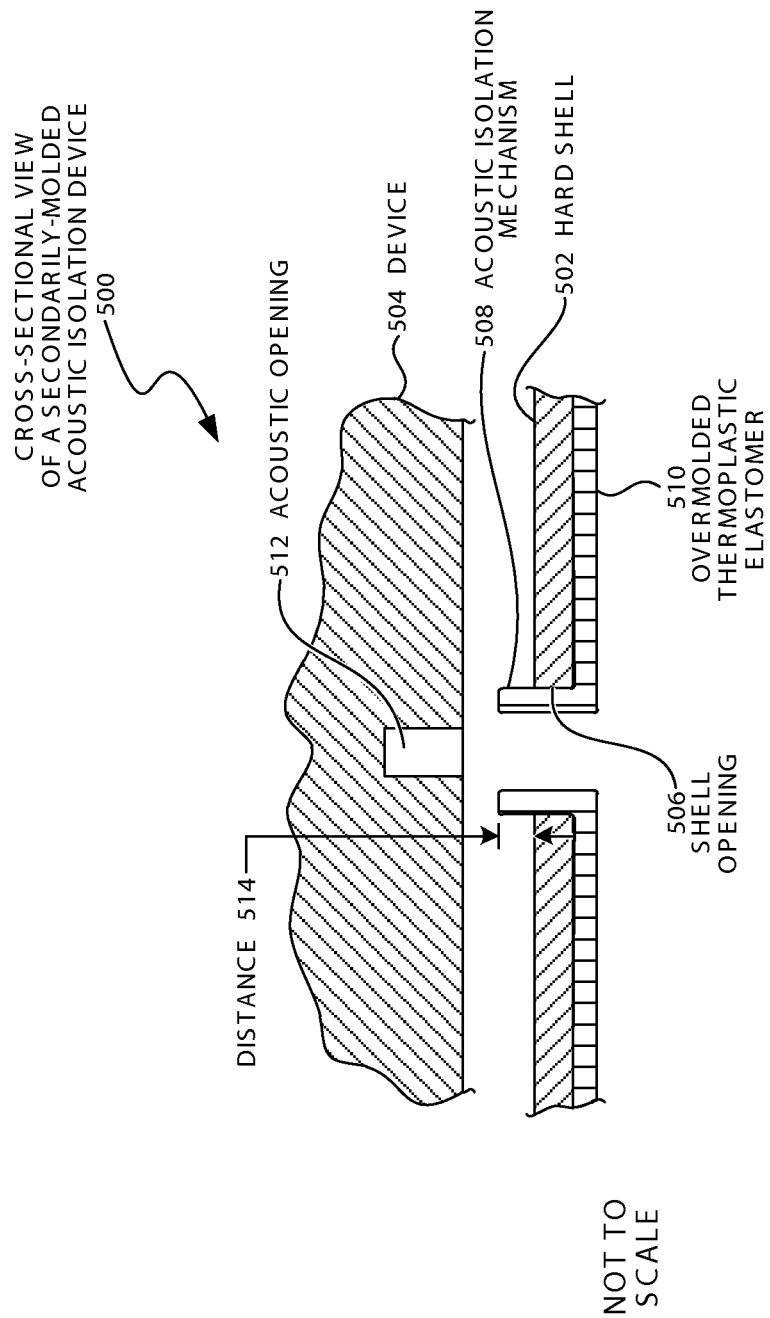
FIG. 5 is a cross-sectional illustration of an embodiment showing a third embodiment of an acoustic isolation mechanism.

FIG. 5 is a cross-sectional view of an embodiment 500 illustrating a formed-in-place acoustic isolation mechanism. Embodiment 500 is not to scale. Embodiment 500 illustrates an embodiment where a hard shell 502 may have an acoustic isolation mechanism 508 that may be formed in place to seal against a device 504. The hard shell 502 and device 504 are illustrated in close proximity, but not in the final assembled state. The final assembled state may be when the device 504 contacts and compresses the acoustic isolation mechanism 508.

Embodiment 500 illustrates a design where the acoustic isolation mechanism may be formed onto the hard shell 502 using a secondary molding process. In such a process, the hard shell 502 may be molded first, then the overmolded thermoplastic elastomer 510 may be molded directly onto the hard shell 502.

The design of the acoustic isolation mechanism 508 may be any shape that may seal against the device 504. In the case of embodiment 500, the thermoplastic elastomer 510 may be formed to extend inwards by a distance 514 to seal against the device 504 around the acoustic opening 512. The thermoplastic elastomer 510 may be formed into the shell opening 506.

Figure 6:
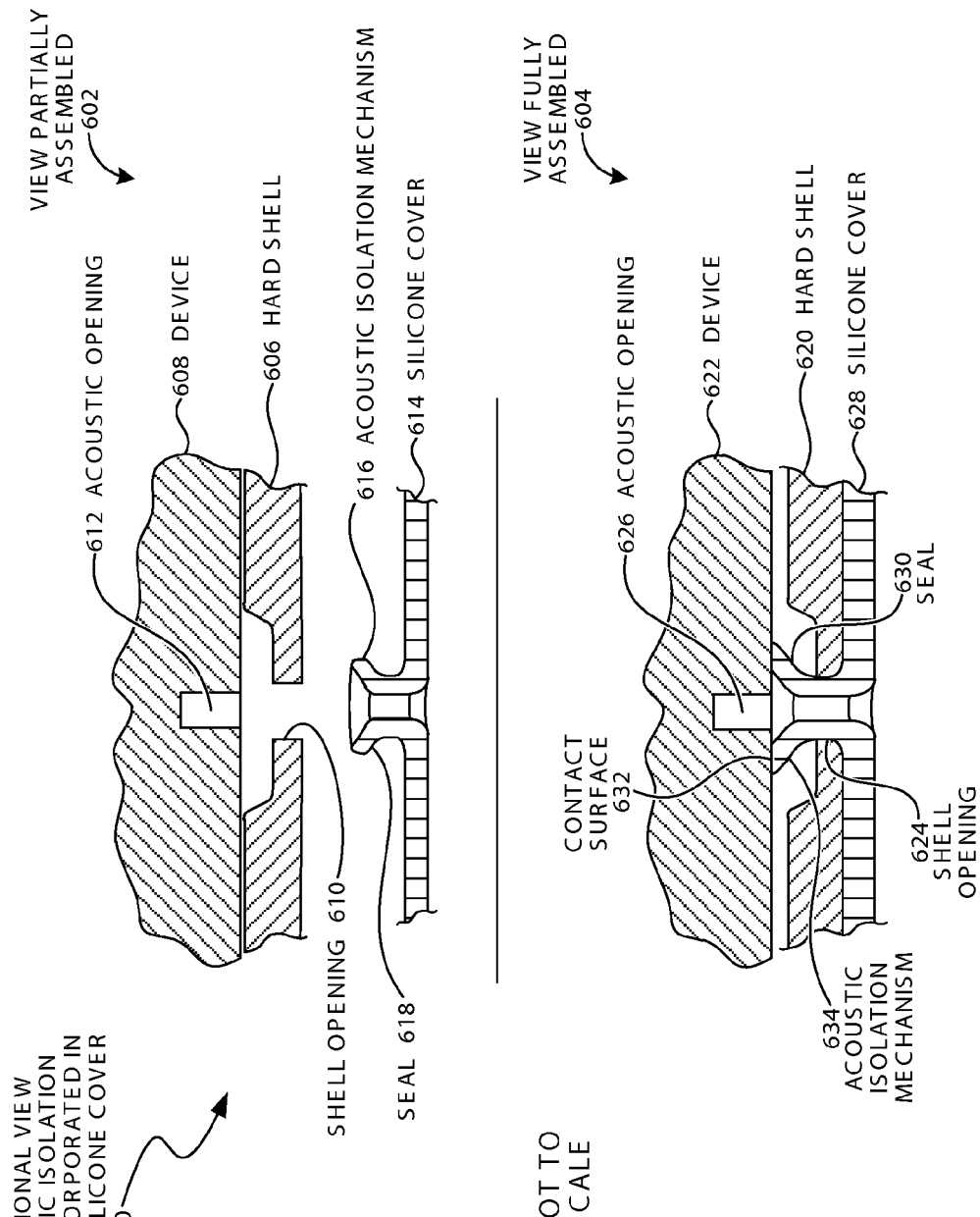
FIG. 6 is a cross-sectional illustration of an embodiment showing a fourth embodiment of an acoustic isolation mechanism.

FIG. 6 is a cross-sectional illustration of an embodiment 600 showing an acoustic isolation mechanism that may be incorporated into a removable silicone cover. Embodiment 600 is not to scale. Embodiment 600 illustrates a partially assembled view 602 and a fully assembled view 604.

In the partially assembled view 602, a hard shell 606 is shown installed onto a device 608. The shell opening 610 is approximately aligned with the acoustic opening 612. A silicone cover 614 may have a built-in acoustic isolation mechanism 616 that may have a flexible seal 618.

In the installation process, the hard shell 606 may be installed onto the device 608. The design of the hard shell 606 may be such that a gap or space may be available between the hard shell 606 and the device 608, and the device 608 may be loosely contained within the hard shell 606. In a typical embodiment, a two piece hard shell may enclose the device 608 using snap fits or other engagement mechanism. In a one piece hard shell embodiment, a single piece hard shell may engage the device by snapping or bending to fit over and capture the device.

As a second step in the installation process, the silicone cover 614 may be fitted over the hard shell 606 and the acoustic isolation mechanism 616 may be forced into the shell opening 610. As the acoustic isolation mechanism 616 is installed into the shell opening 610, the acoustic isolation mechanism 616 may form a seal to the surface of the device 608 and may also take up some slack or fill the gap between the hard shell 606 and the device 608.

The fully assembled view 604 may show the hard shell 620 installed onto the device 622, with the shell opening 624 aligned with the acoustic opening 626.

The acoustic isolation mechanism 634 of the silicone cover 628 may be forced into the shell opening 624, resulting in the seal 630 being pressed against the device 622 in the area of the contact surface 632. As shown in FIG. 6, the passageway within the acoustic isolation mechanism 634 can expand in width proximate the shell opening 624 or proximate the seal 630.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A protective cover for an electronic device, the protective cover comprising:
    a hard shell case for enclosing an electronic device, the hard shell case comprising:
        a rigid bottom member that includes a back plane and one or more perimeter walls extending from the back plane at a perimeter portion of the back plane, the back plane having an exterior surface and an interior surface, the interior surface configured to receive a rear surface of the electronic device when the electronic device is at least partially enclosed by the rigid bottom member, and
        a rigid top member configured to be joined to the rigid bottom member to at least partially enclose the electronic device, the rigid top member including at least part of an aperture formed to provide access to a touchscreen of the electronic device when the electronic device is disposed in the hard shell case,
    wherein
        at least one of the rigid bottom member and the rigid top member includes one or more shell openings positioned for correspondence to one or more respective acoustic openings of the electronic device, the one or more shell openings positioned to convey acoustic signals between an exterior of the hard shell and the one or more respective acoustic openings of the electronic device, and
        an intentional gap exists between at least one of the shell openings in the hard shell case and the respective one or more acoustic opening of the electronic device when the electronic device is installed in the hard shell case; and
    an acoustic isolation mechanism disposed in the intentional gap at the at least one of the shell openings, the acoustic isolation mechanism having an uncompressed thickness that is larger than the intentional gap,
    wherein
        the acoustic isolation mechanism comprises a compliant material that compresses when the electronic device is installed in the hard shell case, the compression of the compliant material minimizing shifting or rattling of the electronic device when the electronic device is installed in the hard shell case, and
        the acoustic isolation mechanism comprises a passageway through which sound passes through the one or more shell openings in the hard shell case to corresponding one or more of the acoustic openings in the electronic device when the electronic device is installed in the hard shell case.

2. The protective cover of claim 1, wherein the acoustic isolation mechanism comprises a flexible lip that deforms and creates an airtight seal around the respective one or more acoustic openings of the electronic device to reduce echoing between the hard shell case and the electronic device when the electronic device is installed in the hard shell case.

3. The protective cover of claim 1, wherein the passageway within the acoustic isolation mechanism expands in width proximate the shell opening.

4. The protective cover of claim 2, wherein the passageway within the acoustic isolation mechanism expands in width proximate the airtight seal.

5. The protective cover of claim 1, wherein the acoustic isolation mechanism is incorporated into a removable flexible component that wraps around the hard shell case.

6. The protective cover of claim 1, wherein the one or more shell openings include a first shell opening that is formed in one of the perimeter walls and a second shell opening that is formed through a same surface as the aperture in the rigid front member, the first and second shell openings corresponding to respective acoustic openings of the one or more acoustic openings of the electronic device, and instances of the acoustic isolation mechanism being disposed at each of the first and second shell openings.

7. The protective cover of claim 6, wherein first shell opening is formed in a lower perimeter wall of the one or more perimeter walls, the lower perimeter wall configured to abut a bottom edge of the electronic device when the electronic device is disposed within the hard shell case.

* * * * *